Aug. 7, 1956 R. A. FINDLAY 2,758,141
SEPARATION OF AROMATICS BY SO₂ EXTRACTION
Filed Nov. 19, 1951
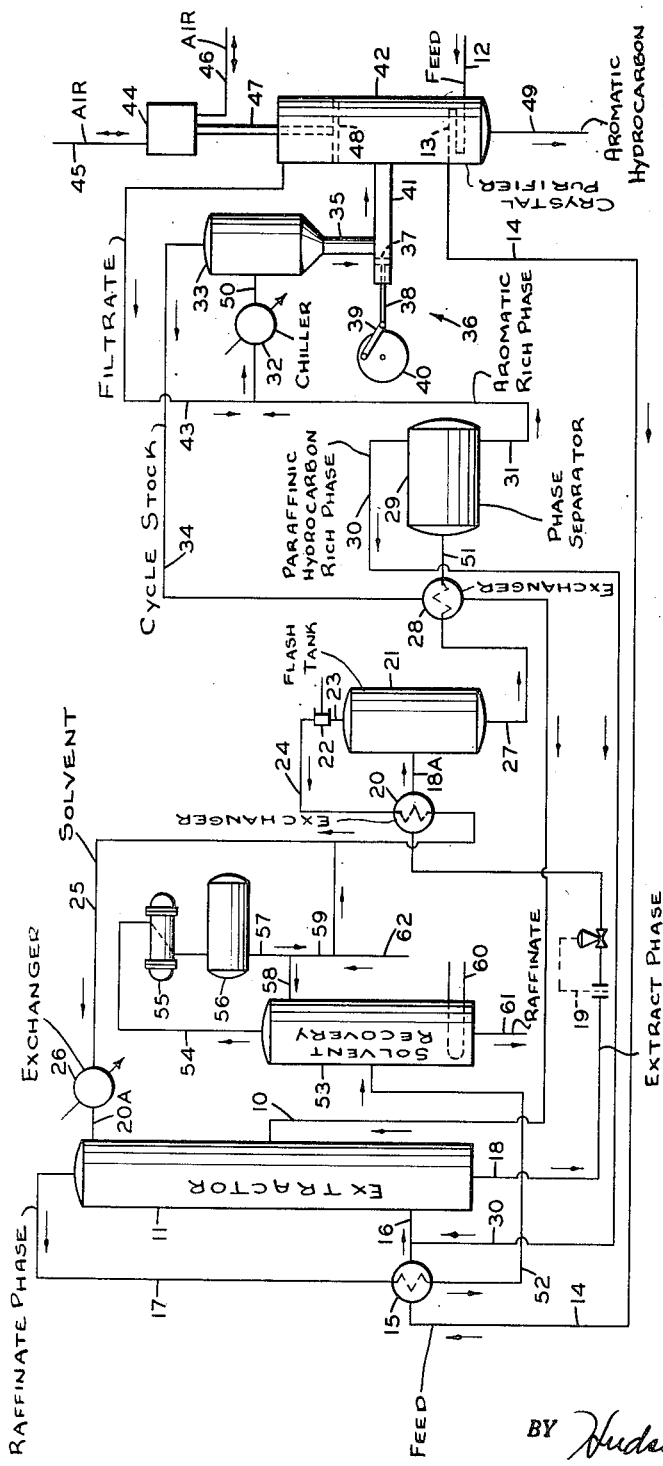
INVENTOR.
R. A. FINDLAY
BY Hudson & Young
ATTORNEYS

United States Patent Office 2,758,141
Patented Aug. 7, 1956

2,758,141

SEPARATION OF AROMATICS BY SO₂ EXTRACTION

Robert A. Findlay, Bartlesville, Okla., assignor to Phillips Petroleum Company, a corporation of Delaware Application November 19, 1951, Serial No. 257,116

12 Claims. (Cl. 260—674)

This invention relates to solvent extraction. In one aspect it relates to a method for separating a hydrocarbon of one type from a hydrocarbon of another type in a solvent extraction operation. In another aspect it relates to a method of separating an aromatic hydrocarbon from admixture with a difficultly separable paraffin hydrocarbon in a solvent extraction operation.

Distillation methods have been used for many years for separation of hydrocarbon mixtures into fractions or even into individual hydrocarbon products. In some cases a narrow boiling range fraction of hydrocarbons taken overhead from a distillation column may contain two or more hydrocarbons, the separation of which from one another is very, very difficult. For example a mixture of 2,2-dimethylpentane boiling at 174° F. with 2,4-dimethylpentane boiling at 176° F. is very difficult to separate into the individual components. By the term "close boiling hydrocarbons" as used throughout this specification and claims is meant mixtures of such hydrocarbons having relatively close boiling points such as the above mentioned values. When boiling points of hydrocarbons differ even more than 2 degrees such as 8 or 10° F., separation into component hydrocarbons is still very difficult, and such a boiling point range is within the scope and conception of a narrow boiling range.

The separation of hydrocarbons of boiling points differing more than the above mentioned boiling point ranges may still be very difficult. For example, n-hexane boils at about 159° F. and benzene boils at about 177° F. but it is impossible to separate these hydrocarbons completely in a simple fractional distillation operation. The reason for this is that these two hydrocarbons form an azeotropic mixture and they distill overhead in a column in a certain ratio and as long as some or both hydrocarbons are present in the kettle both hydrocarbons will appear in the overhead condensate. These hydrocarbons differ in boiling points from each other by about 18° F., yet they cannot be separated from each other by ordinary distillation procedures.

According to my invention I am able to separate, for example, benzene boiling at about 177° F. from admixture with 2,2-dimethylpentane boiling at 174° F. and 2,4-dimethylpentane boiling at 176° F. Because of very close boiling points, it is impossible to separate these hydrocarbons, or specifically benzene from the isoparaffins in any type of a distillation operation. According to my process I extract the benzene from such an admixture with liquid sulfur dioxide and then I recover the benzene from the extract phase in a crystallization operation which gives a very pure benzene product.

An object of my invention is to devise a process for separating such difficulty separable hydrocarbon as benzene from close boiling isoparaffins.

Another object of my invention is to provide a method for making such an operation with the ultimate production of pure products.

Still another object of my invention is to devise a process for separating aromatic hydrocarbons from difficultly separable paraffinic hydrocarbons which is relatively simple and inexpensive to operate.

The drawing illustrates in diagrammatic form an assembly of apparatus parts useful in carrying out the process of my invention. In the drawing, reference numeral 11 identifies a liquid-liquid contacting zone for contacting two partially immiscible liquids in a solvent extraction operation. Such a column is usually equipped with efficient liquid-liquid contacting apparatus such as bubble cap trays or the like. A line 16 enters the bottom of this column for introduction of feed stock. A line 18 at the bottom of the column is for withdrawal of extract phase, while a line 17 at the top is for removal of raffinate phase. Column 53 is a conventional fractional distillation column equipped with a reboiler coil 60, an overhead vapor line 54 with auxiliary parts for condensing overhead vapors and for introducing a portion of condensate to column 53 as reflux.

Vessel 21 is a vessel in which a flashing operation takes place. This vessel is provided with several pipe connections which will be identified hereinafter. A vessel 29 is a phase separator vessel in which liquid entering the vessel is given retention time for settling purposes. A vessel 33 is also a settling vessel but is intended for settling a crystalline material in the form of a slurry from a liquid. A conduit 35 is for transfer of the above mentioned slurry to a conduit 41.

The apparatus identified by reference numeral 36 is a feed apparatus for a slurry which apparatus contains a piston 37 to which is connected a piston rod 38. This piston rod is pivoted to a pitman 39, which in turn is operated by a source of power 40. Upon rotation of element 40 the pitman and piston rod operate to reciprocate the piston. When the piston moves from left to right, as in the drawing, material received in conduit 41 from conduit 35 is forced into a vessel 42. When the piston 37 moves from right to left additional material from conduit 35 enters the conduit 41. The vessel 42 is a crystal purifier apparatus which is fully described in a copending application, Serial No. 166,992, filed June 9, 1950. Briefly however, this crystal purifier 42 is a hollow cylindrical vessel vertically disposed. In the upper portion of the vessel is a porous piston 48 to which is attached a piston rod 47. The upper end of the piston rod 47 extends to a cylinder 44 which also contains a piston, not shown. Air for moving the piston in vessel 44 downward is admitted to this vessel through a line 45 from a source, not shown. When this piston moves downward air below the piston is exhausted through a line 46. For moving this piston upward air from a source, not shown, is admitted through line 46 to the under side of said piston and air above the piston exhausts through the line 45. Thus air pressure is used to move vertically upward and downward the porous piston 48 in the crystal purifier. A coil 13 in the lower portion of this crystal purifier 42 is for the purpose of supplying heat for melting crystals of material which reach the bottom of the vessel.

Element 15 is a heat exchanger and is so arranged that material flowing through line 17 cools material flowing from line 14 to line 16. Element 20 is also a heat exchanger and is used for heating material flowing from line 18 to line 18A. Element 28 is also a heat exchanger and is used for cooling material flowing from line 27 to line 51. Element 26 is a heat exchanger for cooling material flowing from line 25 to line 20A. Element 32 is a refrigeration apparatus for chilling material flowing from lines 31 and 43 to line 50. The refrigeration apparatus 32, the settler 33, line 50, conduit 35, conduit 41 and the crystal purifier apparatus 42 are all well insulated thermally. The remainder of the apparatus parts of the drawing will be explained hereinafter in the explanation of the operation of the process.

I will explain the operation of the process of my invention using as an example the processing of a hydrocarbon mixture containing about 80 weight per cent of a paraffin hydrocarbon and 20 weight per cent of benzene. The hydrocarbon comprising this 80 weight per cent is one or more hydrocarbons which are difficult to separate by distillation methods from benzene either because of their closeness in boiling points or because of the formation of azeotropes. This feed stock is introduced into the system through a line 12 from a source, not shown. From line 12 this feed passes through the coil 13 in the lower part of the crystal purifier 42 in which the feed stock is cooled. From coil 13 the feed passes on through line 14 into the heat exchanger 15 in which the charge is further cooled. This charge material is cooled in this exchanger to a temperature of about −30° to −35° C. and is passed on through the feed line 16 into the liquid-liquid extractor 11. In this extractor 11 is maintained a downward flowing body of liquid sulfur dioxide. This sulfur dioxide extractant is introduced into the extractor through a line 20A. In this column the downward flowing liquid sulfur dioxide intimately contacts the upward flowing hydrocarbon material. In this contacting the sulfur dioxide dissolves or absorbs the aromatic hydrocarbon in preference to the paraffinic hydrocarbon. The hydrocarbon material which reaches the top of vessel 11 as a hydrocarbon phase is removed therefrom through the line 17 as a raffinate phase. This raffinate phase is passed on through line 17 to the heat exchanger 15 in which it passes in indirect heat exchange with the feed stock. In cooling the feed stock in exchanger 15 the raffinate phase becomes warmed somewhat and is passed on through a conduit 52 to a sulfur dioxide recovery still 53. In this still the raffinate phase is stripper of its sulfur dioxide content. Overhead vapors pass through the line 54 to a condenser 55 in which the overhead material is condensed. Condensate is received in an accumulator 56. The portion of this condensate which is needed for refluxing purposes is passed from the accumulator through a conduit 57, a conduit 58 and is introduced into the top of the fractionator. Heat for reboiling purposes is furnished by a reboiler coil 60. Bottoms material comprising paraffinic hydrocarbon is removed from the still through a line 61 as one of the products of the process.

The extract phase is withdrawn from the contacting zone 11 through the extract line 18. A back pressure regulator 19 is disposed in line 18 for maintenance of sufficient pressure on the extractor 11 to make certain that sulfur dioxide is maintained in the liquid state under the temperature conditions existing therein. As the extract phase passes through the regulator valve 19 some pressure reduction occurs with resultant vaporization and cooling to some extent the unvaporized portion of the extract phase. The heat exchanger 20 is intended to warm this extract phase so that upon introduction into the flash vessel 21 an appreciable portion of the sulfur dioxide will flash vaporize. The temperature maintained in the flash chamber 21 is about −30° C. The vaporous sulfur dioxide is withdrawn through a line 23, is compressed by a compressor 22 from which the gas is passed on through a line 24 to the heat exchanger 20. This compressing operation of course warms the sulfur dioxide somewhat and this warmed gas furnishes the heat for the heat exchanger 20. From the heat exchanger 20 the sulfur dioxide passes on through the line 25 to the chiller 26 in which the sulfur dioxide is chilled and condensed to a liquid having a temperature of about −30° to −35° C. Prior to this chilling operation the sulfur dioxide has a temperature of about −25° C. Thus the refrigeration load on the chiller 26 is not heavy. The sulfur dioxide cooled in chiller 26 constitutes a major portion of the solvent in the extraction operation.

From the bottom of the flash vessel 21 the flash residue is withdrawn through a conduit 27 and the material is cooled in the chiller 28 to a temperature of about −55° C. The cooled extract phase residue is passed on through a line 51 into the phase separator 29. In this vessel 29 a liquid phase comprising paraffinic hydrocarbon but containing some aromatic hydrocarbon and sulfur dioxide in solution is removed through a conduit 30 and is added to the main body of feed stock in the conduit 16. Thus the combined stream of raw feed and this recycle stock actually constitutes the feed stock to the extractor 11. The lower liquid phase accumulating in the separator 29 is an aromatic hydrocarbon-rich phase containing some sulfur dioxide in solution. This material is passed through a conduit 31 and combined with some recycled material from a conduit 43 and the combined stream is chilled in the refrigeration apparatus 32. In this refrigeration apparatus this combined stream is cooled to a temperature of about −80° C. This cooled material is passed on through the line 50 into the separator vessel 33. In this vessel 33 crystals of benzene settle to the bottom and accumulate as a slurry. The supernatant liquid is withdrawn through a conduit 34 and is passed through the heat exchanger 28 and thence the conduit 10 into the extractor vessel 11 at an intermediate point. This stream of material consists largely of sulfur dioxide containing some little aromatic hydrocarbon in solution. As the supernatant liquid is withdrawn through the line 34 it has a temperature of about −80° C. which material serves to cool the material flowing from line 27 to line 51 to a temperature of about −55° C. In this heat exchange operation the refrigerant leaving exchanger 28 and entering line 10 has a temperature of about −35° C. and this is about the temperature of the contents of the extraction vessel 11.

The slurry which settles to the bottom of the settler 33 passes through the conduits 35 and 41. As the source of motive power 40 operates the piston 37, this slurry material is withdrawn from conduit 35 and is introduced into the crystal purifier vessel 42 via conduit 41. This vessel and its auxiliary parts are relatively simple in construction and operation. The piston element 48 is a porous piston and is intended to operate in such a manner that as it moves downward it tends to compress and to force downward a bed of benzene crystals below it and to express from this bed of crystals liquid which flows upward and through the porous piston. As this liquid or filtrate reaches the top of the vessel 42 it is removed from this vessel through the line 43. This material flows from line 43 and is combined with the aromatic hydrocarbon-rich phase from line 31, the combined streams making up the feed to the chiller 32 and slurry settler 33. The crystals which are compressed and forced downward by the downward movement of the porous piston 48 ultimately reach the region of the heating coil 13. Sufficiently high temperature is maintained in this coil to melt the benzene crystals. It is intended that the porous piston 48 be operated in such a manner that upon its downward movement, not only is filtrate liquid moved upward and through the piston but a small quantoty of the melted benzene is also forced upward and through the bed of downward moving benzene crystals as reflux. In this manner the upward movement of some little melted benzene tends to reflux and to wash in a very effective manner the filtrate material entering the crystal purifier 42 in an upward direction. Thus paraffinic hydrocarbon which enters the purifier 42 and dissolved sulfur dioxide, both of which materials remain in the liquid state are ultimately removed from the top of this vessel through the line 43. In this manner only relatively pure benzene actually reaches the bottom of this vessel for removal through the product line 49. The benzene product withdrawn through the line 49 is passed to storage or such disposal as desired.

The motive force for operating the porous piston 48 may be compressed air and I find that such motive source is very effective for such an operation. For moving the piston downward compressed air is introduced into the cylinder 44 through the line 45 and air pressure moves the piston disposed on the upper end of the shaft 47 downward, exhaust air passing through the line 46. For moving the piston upward compressed air is admitted through the line 46 and exhaust air is passed through line 45.

The rate of introduction of the relatively pure sulfur dioxide from line 20A to the top of the extractor 11 is from 0.15 to 0.25 volume per volume of feed stock. The rate of introduction of the recycled sulfur dioxide of intermediate quality through the line 10 is from 0.25 to 0.35 volume per volume of feed stock. The pressure maintained in flash chamber 21 is from about 1½ to 2 pounds per square inch absolute. This less than atmospheric pressure is maintained in this flash vessel by the action of the compresser 22. When operating under these conditions the paraffinic material removed as raffinate product is of a purity of 95 per cent and higher on a weight basis. The benzene product as a main product of the process and passing through line 49 is of 99.5 per cent purity on a weight basis.

The process of my invention is applicable to the separation of other aromatic hydrocarbons from the above mentioned or other paraffinic hydrocarbons, for example para-xylene which has a melting point of 13.2° C., can be separated from difficultly separable paraffinic hydrocarbons. The operating conditions in which a para-xylene-paraffinic hydrocarbon mixture can be separated are more or less similar to those disclosed hereinabove in the benzene system, since the freezing point of the para-xylene is relatively close to that of benzene. Meta-xylene which melts at —47.4° C. may also be separated from difficultly separable paraffinic hydrocarbons. Because of the lower melting point of the meta-xylene the temperatures of the various operational steps will need to be considerably lower than those for the benzene system. The process may also be applied to the separation of ortho-xylene from paraffinic hydrocarbons. Ortho-xylene has a melting point of —25° C. The temperatures which should be maintained in the several operational steps when operating on an ortho-xylene system will be intermediate to those carried in the meta-xylene system and those of the benzene and para-xylene systems.

The process of my invention is applicable not only to the separation of a single aromatic hydrocarbon from one or more paraffinic hydrocarbons but it may be used for the separation of the mixtures of the above mentioned aromatic hydrocarbons. However, when operating on charge stocks containing mixtures of aromatic hydrocarbons the operational temperatures of the various steps of the process will need to be determined accordingly, taking into consideration that one hydrocarbon lowers the freezing point of another hydrocarbon of a solution.

The chilling operation carried out in chiller 32 is one of the critical steps of the process. Since sulfur dioxide and benzene form a eutectic, it is important to carry out the cooling operation in chiller 32 to such a temperature that a solid material of eutectic composition will not be formed. In other words, the temperature maintained in chiller 32 must be somewhat above the eutectic temperature of the benzene-sulfur dioxide system. If it is desired to conduct the chilling operation in chiller 32 so that as much as possible of the benzene is crystallized then the chiller must be so operated that the chilled effluent therefrom will have a temperature of about —80° C. Sulfur dioxide has a freezing point of about —76° C. and as long as there is a greater concentration of benzene in the system then the concentration of benzene in the eutectic, benzene will be the component which freezes and this freezing may be carried out at a temperature of —80° C. which temperature is higher than the benzene-sulfur dioxide eutectic temperature. When operating on, for example, a system containing a mixture of benzene and para-xylene with sulfur dioxide as the solvent, the eutectic temperature at which either benzene and sulfur dioxide or para-xylene and sulfur dioxide separate as a solid phase will be somewhat lower than the benzene-sulfur dioxide eutectic temperature since the third component has a lowering effect on the eutectic temperature. If however, it is not necessary to crystallize substantially all of the excess benzene over the benzene concentration of the eutectic in the chiller 32, this chiller may then be operated at a higher temperature than —80° C. Under this higher temperature condition a smaller proportion of the benzene is crystallized and a proportionally larger proportion of the benzene will be removed from the slurry settler 33 through the line 34 along with sulfur dioxide for recycling into the extractor vessel 11. As a result of this higher chiller temperature in 32 there will be a larger proportion of filtrate removed through the porous piston 48 in the purifier vessel 42 for recycling through conduit 43 to the chiller 32. Thus, one may elect to operate the chiller 32 at higher temperature but the operation is penalized by proportionally greater recycles, while if the chiller 32 is operated at as low a temperature as possible there is less recycle material to process.

While hereinbefore it was mentioned that chiller 32, line 50, settler 33, and conduits 35 and 41 and the crystal purifier 42 were well insulated thermally, it will be understood by those skilled in the art that all vessels, conduits, etc., which contain low temperature materials in process are likewise insulated thermally.

Such auxiliary apparatus as valves, pumps, pressure and temperature recording and controlling apparatus, flow controllers and the like are not shown for purposes of simplicity. The necessity of such auxiliary apparatus, its installation and operation are well known by those skilled in the art.

While certain embodiments of the invention have been described for illustrative purposes, the invention is not limited thereto.

I claim:

1. In the separation of an aromatic hydrocarbon selected from the group of aromatic hydrocarbons consisting of benzene and the xylenes from admixture with a paraffin hydrocarbon difficultly separable therefrom by distillation, the improvement comprising mixing said admixture of hydrocarbons with liquid sulfur dioxide, subjecting this mixture to solvent extraction conditions, separating an extract phase from a raffinate phase, removing dissolved sulfur dioxide from the paraffin hydrocarbons of the raffinate phase and recovering the paraffin hydrocarbons as one product of the process, removing by flashing sulfur dioxide from the extract phase and thereby chilling the unvaporized material, separating by gravity separation the chilled unvaporized material into a paraffin hydrocarbon-rich liquid phase and a liquid phase rich in said aromatic hydrocarbon, and containing sulfur dioxide, withdrawing these phases, and further chilling the withdrawn aromatic hydrocarbon-rich phase containing sulfur dioxide to a temperature for crystallizing said aromatic hydrocarbon and above the aromatic hydrocarbon-sulfur dioxide eutectic temperature to form crystals of said aromatic hydrocarbon, from this aromatic hydrocarbon freezing operation separating a phase rich in sulfur dioxide and a slurry comprising crystalline aromatic hydrocarbon and liquid sulfur dioxide introducing this slurry into a purifier zone, expressing liquid from the aromatic hydrocarbon crystals, removing the expressed liquid, melting the aromatic hydrocarbon crystals resulting from the expressing operation, and recovering the melting aromatic hydrocarbon as a second product of the process.

2. The process of claim 1 wherein the aromatic hydrocarbon is benzene.

3. The process of claim 1 wherein the aromatic hydrocarbon comprises para-xylene.

4. The process of claim 1 wherein the aromatic hydrocarbon comprises meta-xylene.

5. In the process of claim 1 wherein said difficultly separable paraffin hydrocarbon comprises n-hexane.

6. In the process of claim 1 wherein said difficultly separable paraffin hydrocarbon comprises an isoparaffin hydrocarbon.

7. A process for recovering an aromatic hydrocarbon selected from the group of aromatic hydrocarbons consisting of benzene and the xylenes from an admixture with difficultly separable paraffin hydrocarbons, comprising maintaining a downwardly moving column of liquid sulfur dioxide in an elongated vertically disposed liquid-liquid contacting zone, introducing liquid sulfur dioxide into the top of said zone, introducing said hydrocarbon admixture into the lower portion of said zone, removing raffinate phase from the top of said zone, separating dissolved sulfur dioxide from said raffinate phase and recovering therefrom said paraffin hydrocarbons as one product of the process, removing extract phase from the bottom of said zone, removing sulfur dioxide from said extract phase in a flashing operation whereby the flash residue is chilled, liquefying the flashed sulfur dioxide and returning same as the major portion of the liquid sulfur dioxide introduced into the top of said zone, further chilling the residue of the flashing operation, from this further cooled residue separating by gravity separation a phase lean in said aromatic hydrocarbon and a phase rich in said aromatic hydrocarbon, introducing said phase lean in said aromatic hydrocarbon into said contacting zone at the hydrocarbon feed level, further chilling said phase rich in said aromatic hydrocarbon to a freezing temperature of said aromatic hydrocarbon, from this aromatic hydrocarbon freezing operation separating a phase rich in sulfur dioxide and introducing same into said contacting zone at an intermediate level, from the aromatic hydrocarbon freezing operation also separating a slurry comprising crystalline aromatic hydrocarbon and liquid sulfur dioxide, introducing this slurry into a purifier zone, expressing liquid from the aromatic hydrocarbon crystals, removing the expressed liquid and introducing it into said phase rich in said aromatic hydrocarbon, melting the aromatic hydrocarbon crystals resulting from the expressing operation, and removing liquid aromatic hydrocarbon as a second product of the process.

8. The process of claim 7 wherein the aromatic hydrocarbon is benzene.

9. The process of claim 7 wherein the aromatic hydrocarbon is para-xylene.

10. The process of claim 7 wherein the aromatic hydrocarbon is meta-xylene.

11. In the process of claim 7 wherein the difficultly separable paraffin hydrocarbon comprises n-hexane.

12. In the process of claim 7 wherein the difficultly separable paraffin hydrocarbon comprises an isoparaffin hydrocarbon.

References Cited in the file of this patent

UNITED STATES PATENTS

| | | |
|---|---|---|
| 1,871,694 | Ihrig | Aug. 16, 1932 |
| 1,991,843 | Campbell et al. | Feb. 19, 1935 |
| 2,146,147 | Keith et al. | Feb. 7, 1939 |
| 2,305,038 | Schumacher | Dec. 15, 1942 |
| 2,413,674 | Weir | Dec. 31, 1946 |
| 2,484,834 | Keeling | Oct. 18, 1949 |
| 2,562,068 | Souders | July 24, 1951 |